United States Patent
Jiang et al.

(10) Patent No.: US 10,836,922 B2
(45) Date of Patent: Nov. 17, 2020

(54) INK COMPOSITIONS WITH IMPROVED CONDUCTIVITY

(71) Applicant: Henkel IP & Holding GmbH, Duesseldorf (DE)

(72) Inventors: Hong Jiang, Irvine, CA (US); Himal Khatri, Irvine, CA (US); Bo Xia, Irvine, CA (US); Aziz Shaikh, San Diego, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 82 days.

(21) Appl. No.: 15/898,335

(22) Filed: Feb. 16, 2018

(65) Prior Publication Data

US 2018/0171168 A1    Jun. 21, 2018

Related U.S. Application Data

(63) Continuation of application No. PCT/US2016/045294, filed on Aug. 3, 2016.

(60) Provisional application No. 62/205,843, filed on Aug. 17, 2015.

(51) Int. Cl.

| | |
|---|---|
| *H01B 1/22* | (2006.01) |
| *C09D 11/52* | (2014.01) |
| *C09D 11/03* | (2014.01) |
| *C09D 11/102* | (2014.01) |
| *C08K 3/10* | (2018.01) |
| *C09D 5/24* | (2006.01) |
| *C09D 11/104* | (2014.01) |
| *C08K 5/09* | (2006.01) |
| *C08K 3/08* | (2006.01) |
| *C08K 5/02* | (2006.01) |
| *C08K 5/03* | (2006.01) |

(52) U.S. Cl.
CPC ............... *C09D 11/52* (2013.01); *C08K 3/10* (2013.01); *C09D 5/24* (2013.01); *C09D 11/03* (2013.01); *C09D 11/102* (2013.01); *C09D 11/104* (2013.01); *H01B 1/22* (2013.01); *C08K 5/02* (2013.01); *C08K 5/03* (2013.01); *C08K 5/09* (2013.01); *C08K 2003/0806* (2013.01); *C08K 2201/005* (2013.01); *C08K 2201/011* (2013.01)

(58) Field of Classification Search
CPC . H01B 1/22; C09D 5/24; C09D 11/52; C09D 11/00; B23K 35/00
USPC ............... 174/126.2; 252/500; 106/31.13
See application file for complete search history.

(56) References Cited

U.S. PATENT DOCUMENTS

| | | | |
|---|---|---|---|
| 2004/0004209 A1 | 1/2004 | Matsuba et al. | |
| 2012/0273263 A1 | 11/2012 | Nagarajan et al. | |
| 2015/0217409 A1* | 8/2015 | Akagawa | B23K 35/00 |
| | | | 174/126.2 |

FOREIGN PATENT DOCUMENTS

| | | |
|---|---|---|
| CN | 101580660 | 11/2009 |
| JP | 2010059409 | 3/2010 |
| JP | 2010059410 | 3/2010 |
| WO | 2006093398 | 9/2006 |
| WO | 2015023370 | 2/2015 |

OTHER PUBLICATIONS

International Search Report issued in connection with International Patent Application No. PCT/US2016/045294 dated Dec. 1, 2016.
Grouchko et al., Conductive Inks with Built-In Mechanisms That Enables Sintering at Room Temperature, vol. 5, No. 4, pp. 3354-3359 (2011).
Madassi et al., Triggering the Sintering of Silver Nanoparticles at Room Temperature, vol. 4, No. 4, pp. 1943-1948 (2010).

* cited by examiner

*Primary Examiner* — Khanh T Nguyen
(74) *Attorney, Agent, or Firm* — Steven C. Bauman

(57) ABSTRACT

Provided herein are ink compositions with improved conductivity. The improved conductivity is attributable to the addition of organohalogen compounds to the composition.

12 Claims, No Drawings

INK COMPOSITIONS WITH IMPROVED CONDUCTIVITY

BACKGROUND

Field

Provided herein are ink compositions with improved conductivity. The improved conductivity is attributable to the addition of organohalogen compounds to the composition.

Brief Description of Related Technology

Conductive ink compositions are known. One of the main constituents used to impart conductivity to those compositions is silver. The price of silver has fluctuated greatly in recent times, making it difficult for manufacturers to manage their product lines. Thus, research and development investigations involving conductivity have been prevalent lately.

Heretofore, various approaches have been used to create conductive ink compositions and to improve the conductivity of such compositions. For instance, silver complexes have been introduced into the compositions and then the compositions have been subjected to elevated temperature conditions, such as greater than 150° C., to decompose the silver complex. After decomposition of the silver complex, in-situ silver nanoparticles are formed, which can enhance electrical conductivity. However, many heat sensitive applications require processing temperatures below 150° C. Aqueous systems have been used, where ionic halogen salts, acids and ionic halogen polymers form constituents of the conductive ink composition. Ionic components are known to cause premature failures in the electronic device, particularly under harsh environmental conditions.

As the use of heat sensitive substrates becomes more prevalent in the electronic industry, there is a strong demand for materials with high electrical conductivity after being processed at temperatures below 150° C. For example, with the advancement of mobile technology, there is a pressing need to decrease bezel width and improve bezel line electrical conductivity on touch screen sensors. A decreased bezel width increases the opportunity to maximize the screen dimensions, all else being the same. However, with a decreased bezel width bezel line electrical conductivity also decreases, resulting in a less sensitive touch panel.

Accordingly, it would be desirable to provide an alternative solution to the need to provide improvements to the manner in which electrical conductivity in conductive ink compositions is achieved.

SUMMARY

The present invention provides such a solution.

Broadly speaking, the invention provides a conductive ink composition comprising A silver component, where at least about 50% of the silver component is made up of silver having a particle size of greater than about 100 nm and less than about 1 um; a carrier; and an organohalogen compound.

The organohalogen compound is useful to improve the electrical conductivity of the ink composition and to maintain the electrical conductivity while reducing the loading of the silver component.

In another aspect, the invention provides a method of improving the electrical conductivity of an ink composition, steps of which comprise
Providing an ink composition comprising
A silver component, where at least about 50% of the silver component is made up of silver having a particle size of greater than about 100 nm and less than about 1 um; and
A carrier; and
Providing an organohalogen compound to the silver component and the carrier,
where the organohalogen compound contacts the silver component to improve electrical conductivity when an electric current is passed through the ink composition.

DETAILED DESCRIPTION

As noted above, the invention provides a conductive ink composition comprising a silver component, where at least about 50% of the silver component is made up of silver having a particle size of greater than about 100 nm and less than about 1 um; a carrier; and an organohalogen compound.

The organohalogen compound is useful to improve the electrical conductivity of the ink composition and to maintain the electrical conductivity while reducing the loading of the silver component.

The silver component may be in any shape that lends itself to the commercial application at hand. For instance, spherical, oblong, powder, and flake shapes of the silver are useful. The silver may be supplied and maintain as a dispersion in an appropriate liquid vehicle or as a solid in dry form.

The silver may be sourced from a variety of commercial suppliers, such as Ames Goldsmith Corporation, Glenn Falls, N.Y., Inframat Advanced Materials, Manchester, Conn. or Metalor Technologies USA Corporation, North Attleboro, Mass. Mixtures of different size silver flakes, such as a mixture of 11000-25, commercially available from Ames, and 47MR-23S, commercially available from Inframat Advanced Materials, Manchester, Conn., may be used as well. D50 and D95 are industry recognized designations for silver having a certain specific particle size. For instance, D50 has approximately fifty percent of the silver particles being smaller than a certain size; D95 has approximately ninety five percent of the silver particles being smaller than a certain size.

The silver component may be used in the range of about 40 to about 80 weight percent of the composition, such as in the range of about 60 to about 75 weight percent of the composition.

The carrier is a vehicle into which the silver component and the organohalogen compound is dispersed. The carrier may be a thermoplastic resin or a thermoset resin. Examples of thermoplastic resins suitable for use as the carrier include thermoplastic polyurethanes, such as those available commercial from The Lubrizol Company, Cleveland, Ohio under the tradename ESTANE, such as under the ESTANE 5700 series, an example of which is ESTANE 5703.

Other thermoplastic resins may be used as well, such as thermoplastic polymers of epichlorohydrin and bisphenol, commercially available as phenoxy resins from InChem Corp, Rocky Hill, S.C.; polyester resins, such as those available commercially from Bostik, Wauwatosa, Wis. under the trade name VITEL, such as under VITEL 2000 series, an example of which is VITEL 2700B; cellulose, such as ethylcellulose (EC), such as EC N7 from Ashland, Wilmington, Del.; cellulose acetate butyrate, such as CAB-531-1 as an example from Eastman Chemicals, Kingsport, Tenn.; acrylic resins, commercially from Dow Chemical, Midland, Mich., under Paraloid trade name, such as Paraloid A14; polyvinyl butyral resin from Sekisui Chemical Co., Tokyo, Japan, such as S-LEC B series, S-LEC BL-1 for example; and polyvinyl acetal resin from Sekisui Chemical Co., Tokyo, Japan, such as S-LEC k Series, S-LEC KS-1 for example.

The composition may optionally further comprise one or more thermoset resins selected from groups consisting of epoxy functionalized resins, acrylates, cyanate esters, silicones, oxetanes, maleimides and the mixtures thereof.

A wide variety of epoxy-functionalized resins are suitable including liquid-type epoxy resins based on bisphenol A, solid-type epoxy resins based on bisphenol A, liquid-type epoxy resins based on bisphenol F, multifunctional epoxy resins based on phenol-novolac resin, dicyclopentadiene-type resins, naphthalene-type epoxy resins and the mixtures thereof. Exemplary epoxy-functionalized resins include diepoxide of cycloaliphatic alcohols, hydrogenated bisphenol A, di functional cycloaliphatic glycidyl ester of hexahydrophthalic anhydride and mixtures thereof.

Suitable (meth)acrylates include compounds having a general structure I as follows:

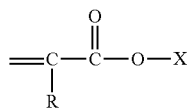

where R is H or methyl, and X is selected from (a) an alkyl group having in the range from 8 to 24 carbon atoms, or (b)

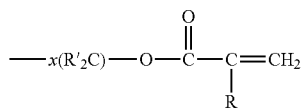

where R is H or methyl, R' is independently selected from H or methyl and x is integer from 2 to 6. Desirably, (meth)acrylates are selected from tridecylmethacrylate, 1,6-hexanediol dimethacrylate, 1,10-decanediol diacrylate, 1,10-decanediol dimethacrylate, 1,12-dodecanediol diacrylate, 1,12-dodecanediol dimethacrylate and mixtures thereof.

Suitable cyanate esters contain two or more ring forming cyanate (—O—C≡N) groups, which form substituted triazine rings upon heating. Cyanate esters that may be used are selected from 1,1-bis(4-cyanatophenyl)methane, 1,1-bis (4-cyanatophenyl)ethane, 2,2-bis(4-cyanatophenyl)propane, bis(4-cyanatophenyl)-2,2-butane, 1,3-bis2-(4-cyanato phenyl)propylbenzene, bis(4-cyanatophenyl)ether, 4,4'-dicyanatodiphenyl, bis(4-cyanato-3,5-dimethylphenyl)methane, tris(4-cyanatophenyl)ethane, cyanated novolak, 1,3-bis4-cyanatophenyl-1-(1-methylethylidene)benzene, cyanated phenol-dicyclopentadiene adduct and the mixtures thereof.

Suitable silicones include a substantially stoichiometric mixture of hydride-terminated polysiloxane(s) and vinyl-terminated polysiloxane(s), where the hydride-terminated polysiloxane is a hydride terminated polydimethylsiloxane and the vinyl-terminated polysiloxane is divinyl terminated polydimethylsiloxane.

Suitable resins also include oxetane containing monomers and/or oligomers.

Suitable maleimide resins include bismalimide, such as BMI-1500 and BMI-3000 from Designer Molecules Inc., San Diego, Calif., structures for which are provided below.

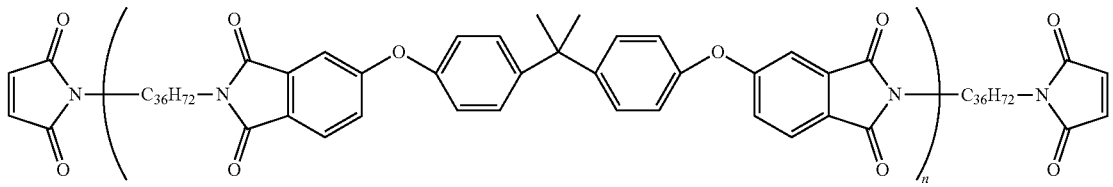

Where n = 1 to 10

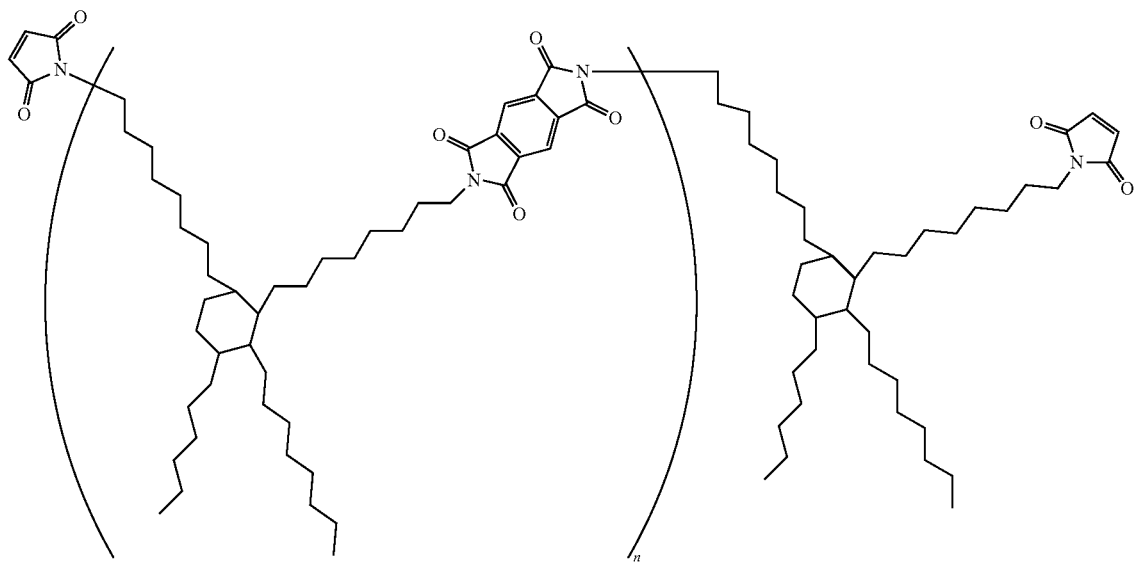

Where n = 1 to 10

The carrier should be used in an amount of about 0.5 to 15 percent by weight.

The organohalogen compound should be a liquid at room temperature. Ordinarily, the organohalogen compound has a boiling point of less than about 150° C., such as for instance less than about 120° C., desirable less than about 100° C., and suitably above about 70° C.

The organohalogen compound desirably has one or more iodine atoms attached thereto. Desirably, only one iodine atom is attached to the organoiodide compound.

The organo portion of the organohalogen compound may be alkyl or aryl. When it is alkyl, it should be a lower alkyl where the alkyl portion is up to twelve carbon atoms.

Representative examples of the organohalogen compound include 2-iodopropane, 1-iodopropane, 2-iodo-2-methylpropane, 2-iodobutane, 2-fluorobenzotrifluoride, 3-fluorobenzotrifluoride, 4-fluorobenzotrifluoride, fluorobenzene, 2-fluoro ethanol, 1-fluorododecane, 1-fluorohexane, 1-fluoroheptane and trifluoroacetic acid. Of course, mixtures of any two or more of these organohalogen compounds may also be used.

The organohalogen compound should be used in an amount of 55 percent by weight. Desirably, such as about 0.05 to 2 percent by weight. For instance, about 0.25 percent by weight has proven to be particularly effective.

In order to render the inventive conductive ink compositions more readily dispensible it is oftentimes desirable to dilute the composition in an appropriate solvent. The dilution should be about 1 part of the composition to about 5 parts of solvent. Many solvents are suitable for use in the inventive compositions, no specific restriction in solvent selection as long as the solvents are compatible with the organohalogen compound.

Representative examples of the solvent include dipropylene glycol methyl ether, carbitol acetate, dimethyl adipate, and mixtures thereof.

The viscosity of the conductive ink composition may be adjusted as desired using various thickeners or thixotropes. For instance, it may be desirable in some commercial applications for the inventive ink composition to have a viscosity in the range of about 10 Pa·s to about 100 Pa·s to optimize its use in high speed printing processes.

Examples of suitable thickeners and thixotropes include hydrogenated castor oil under various trade name, such as ISCATHIX ISP, organic amide, under various trade name, such as ISCATHIX SR, from ISCA UK Lte, Wales, UK; fumed silicas, including Cab-O-Sil TS720 from Cabot Corp., Boston, Mass. These thickeners and thixotropes should be used in an amount of about 0.05% to 2% by weight.

The viscosity of the conductive ink composition may be also adjusted as desired using various dispersants to properly disperse conductive fillers to ensure uniform filler and minimize agglomeration. Example of suitable dispersants include those from Altana available under DISPERBYK trade name, such as DISPERBYK 111 and DISPERBYK 168.

Surface tension modifiers are often used in the formulation to improve substrate wetting and surface texture after processing and curing. Examples of surface tension modifiers are: fluorinated surfactants, such as Capstone series from Dupont, Willmington, Del.; nonionic octylphenol ethoxylate Triton series from Dow Chemical, Midland, Mich.; and polydimethylsiloxane containing surface additive, such as BYK 333, from Altana.

The inventive conductive ink compositions are suitable for applications where high electrical conductivity is required on plastic substrates, such as PET and PC.

Examples

Table I provides a list of organohalogen compounds that are useful as conductivity promoters within the scope of the invention. Organohalogen compounds with boiling points less than about 150° C. encourage a minimum residue in the cured conductive ink.

TABLE I

| Name of Organohalogen | Boiling Point (° C.) |
|---|---|
| 2-iodopropane | 88-90 |
| 1-iodopropane | 101-102 |
| 2-iodo-2-methylpropane | 99-100 |
| 2-iodobutane | 119-120 |
| 2-fluorobenzotrifluoride | 114-115 |
| 3-fluorobenzotrifluoride | 101-102 |
| 4-fluorobenzotrifluoride | 102-105 |
| fluorobenzene | 85 |
| 2-fluoro ethanol | 103 |
| 1-fluorododecane | 106 |
| 1-fluorohexane | 92-93 |
| 1-fluoroheptane | 119 |
| trifluoroacetic acid | 72.4 |

Table II provides conductive ink compositions, both with and without the organohalogen conductivity promoters. The samples were prepared by adding each constituent to a container and homogenizing the mixture for a period of time of about 1 hour at room temperature.

TABLE II

| Component | | Sample (Amt/wt %) | | | |
|---|---|---|---|---|---|
| Type | Identity | Control | A | B | C |
| Resin | PKHB | 2.5 | 2.5 | 2.5 | 2.5 |
| | ESTANE 5703[1] | 1.7 | 1.7 | 1.7 | 1.7 |
| Solvent | Dipropylene glycol methyl ether | 19.6 | 19.7 | 19.6 | 20.1 |
| | DBE-9 | 6.8 | 6.8 | 6.8 | 6.8 |
| Silver | D50: 200 nm; D95: 600 nm | 69.1 | 68.9 | 68.9 | 68.3 |
| Organohalogen | 2-iodopropane | 0 | 0.1 | 0.2 | 0.3 |
| Dispersant | DISPERBYK 111[@] | 0.3 | 0.3 | 0.3 | 0.3 |

[1] A polyester type thermoplastic polyurethane, available commercially from the The Lubrizol Company, Cleveland, OH
[@] A solvent-free wetting and dispersing additive for solvent-borne and solvent-free coatings and printing inks for stabilizing inorganic pigments, in particular titanium dioxide, available commercially from BYK-Chemie GmbH, Wesel, Germany Compared to the control sample, the effect in volume resistivity reduction is very significant at 0.2 percent by weight and 0.3 percent by weight loading of 2-iodopropane as can be seen with reference to Samples B and C, after they have been cured at a temperature of 120° C. for a period of time of 30 minutes. Those samples show 10 to 20 times better conductivity, respectively, than the control. More specifically, volume resistivity, measured in $\Omega \cdot cm$, was measured to be $2.9 \times 10^{-4}$ for the control and for Samples A, B and C, $2.1 \times 10^{-4}$, $2.5 \times 10^{-5}$ and $1.4 \times 10^{-5}$, respectively.

Volume resistivity was measured in the following manner:
1. Take three clean glass slides
2. Place a piece of 3M Scotch Magic tape to each slide such that the entire length and approx. 40% of the width has been covered 3. Place a second piece of 3M Scotch Magic tape parallel to the first piece of tape, such that the edges of the tape are approx. 3 mm apart.
4. Place a second layer of 3M scotch Magic tape on top of the first layer, make sure not to entrap any foreign material or air between tapes, and between tape and glass.
5. Apply material in the 3 mm trench. Use another glass slide to scrape the excess material by moving the glass slide across the tape.
6. Remove tape and cure material for specified time and temperature
7. Allow slides to cool to room temperature before testing
8. Place probes of multimeter 5.0 cm apart on center of material strip, measure resistance in Ω
9. Measure line width with a microscope or a caliper
10. Measure thickness by calipers
11. Calculate VR (Ω-cm)=R (Ω)×width (cm)×thickness (cm)/5 (cm)

In Table III, the effect of various curing conditions for the conductive ink on volume resistivity is shown.

TABLE III

| Curing Conditions | VR (Ω · cm) | |
|---|---|---|
| (° C./min) | Sample C | Control |
| 80/30 | $2.90 \times 10^{-5}$ | $1.70 \times 10^{-4}$ |
| 100/5 | $2.80 \times 10^{-5}$ | $4.10 \times 10^{-4}$ |
| 100/15 | $3.10 \times 10^{-5}$ | $7.60 \times 10^{-4}$ |
| 100/30 | $2.70 \times 10^{-5}$ | $1.90 \times 10^{-4}$ |
| 110/30 | $1.70 \times 10^{-5}$ | $2.60 \times 10^{-4}$ |
| 120/30 | $1.40 \times 10^{-5}$ | $2.90 \times 10^{-4}$ |

The effect of curing conditions on volume resistivity is shown in Table III, where 2-iodopropane is able to lower the volume resistivity by an order of magnitude after curing the ink at temperatures ranging from 80° C. to 120° C. The electrical conductivity enhancement is also observed when the curing time was varied from 5 to 30 minutes at 100 C. High electrical conductivity under low curing temperature and short curing time is highly desirable for heat sensitive plastic substrates, such as PET and PC.

In Table IV the effect of Ag Vol % on volume resistivity is shown.

TABLE IV

| Sample No. | Ag Vol. % after curing | VR (Ω · cm) cured at 120° C./30 min | 2-iodopropane (Amt/wt %) |
|---|---|---|---|
| 1 | 69.5 | 2.71E−05 | 0 |
| 2 | 63.2 | 4.04E−05 | 0 |
| 3 | 60.2 | 6.81E−04 | 0 |
| 4 | 48.7 | Open (∞) | 0 |
| 5 | 48.7 | 1.67E−05 | 0.25 |
| 6 | 44.0 | 2.73E−05 | 0.25 |

The use of organohalogens in conductive ink compositions significantly improve electrical conductivity, even at low silver loading. Typically, in conductive ink compositions, silver will be present in the range of about 55 to about 75 percent by volume. Sample No. 1 is a representative conductive ink composition with a silver content at 69.5 on a (v/w) basis. (The remaining constituents of Sample Nos. 1-6 are resin, solvent and dispersant.) Sample Nos. 1-4 show that without organohalogen, such as 2-iodopropane, as the silver volume percent decreases from 69.5% to 48.7%, the volume resistivity increases. At 48.7%, the volume resistance is so high that the material is no longer registers as conductive. But when 0.25% by weight of iodopropane is added to Sample No. 4 (to become Sample No. 5), Sample No. 5 becomes very conductive, with a volume resistivity measurement of 1.67×10-5 ohm·cm. This value is more conductive than Sample No. 1, which had over a 20 volume percent more loading level of silver (69.5 volume percent). In Sample No. 6, the silver volume percent was further reduced to 44%, with 0.25% by weight of iodopropane added. Sample No. 6 achieved the same volume resistivity as shown by Sample No. 1, which had over a 25 volume percent more loading level of silver (69.5 volume percent).

What is claimed is:

1. A conductive ink composition comprising:
    a silver component, where at least about 50% of the silver component is made up of silver having a particle size of greater than about 100 nm and less than about 1 um;
    a carrier; and
    an organohalogen compound.
2. The ink composition of claim 1, wherein the organohalogen compound is a liquid at room temperature.
3. The ink composition of claim 1, wherein the halogen is an iodide.
4. The ink composition of claim 1, wherein the organohalogen compound is a lower alkane halide.
5. The ink composition of claim 1, wherein the organohalogen compound is represented by halogenated compounds having up to twelve carbon atoms.
6. The ink composition of claim 1, wherein the organohalogen compound has a boiling point of less than about 150° C.
7. The ink composition of claim 1, wherein the organohalogen compound contacts the silver component to improve electrical conductivity.
8. The ink composition of claim 1, wherein the carrier is a thermoplastic resin.
9. The ink composition of claim 1, wherein the carrier is a thermoset resin.
10. The ink composition of claim 1, further comprising a solvent.
11. A substrate on which is disposed the ink composition of claim 1.
12. A method of improving electrical conductivity of an ink composition, steps of which comprise
    providing an ink composition comprising
        a silver component, where at least about 50% of the silver component is made up of silver having a particle size of greater than about 100 nm and less than about 1 um; and
        a carrier; and
    combining an organohalogen compound to with the silver component and the carrier,
    wherein the organohalogen compound contacts the silver component to improve electrical conductivity when an electric current is passed through the ink composition.

* * * * *

UNITED STATES PATENT AND TRADEMARK OFFICE
CERTIFICATE OF CORRECTION

| | | |
|---|---|---|
| PATENT NO. | : 10,836,922 B2 | Page 1 of 1 |
| APPLICATION NO. | : 15/898335 | |
| DATED | : November 17, 2020 | |
| INVENTOR(S) | : Hong Jiang et al. | |

It is certified that error appears in the above-identified patent and that said Letters Patent is hereby corrected as shown below:

In the Specification

Column 5, Line 24 change "amount of 55 percent by weight" to --amount of ≤5 percent by weight--.

In the Claims

Column 8, Line 56 Claim 12 change "compound to with the silver" to --compound with the silver--.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*